(12) United States Patent  
Kulczyk et al.

(10) Patent No.: US 8,229,646 B2  
(45) Date of Patent: Jul. 24, 2012

(54) METHOD AND APPARATUS FOR MONITORING GAS TURBINE BLADES

(75) Inventors: Wojciech Konrad Kulczyk, Hampshire (GB); Anthony Palmer, Hampshire (GB); Matthew Clifton-Welker, Hampshire (GB)

(73) Assignee: Weston Aerospace Limited, Hampshire (GB)

( * ) Notice: Subject to any disclaimer, the term of this patent is extended or adjusted under 35 U.S.C. 154(b) by 804 days.

(21) Appl. No.: 12/318,031

(22) Filed: Dec. 19, 2008

(65) Prior Publication Data

US 2009/0177363 A1    Jul. 9, 2009

(30) Foreign Application Priority Data

Dec. 21, 2007   (GB) .................................. 0725073.1

(51) Int. Cl.
*G06F 19/00*  (2006.01)
*G06G 7/70*  (2006.01)

(52) U.S. Cl. ........ 701/100; 702/145; 702/146; 324/137; 324/654; 73/112.01; 73/112.05; 73/114.26

(58) Field of Classification Search .............. 701/29, 701/34–35, 100; 60/625, 772, 779; 702/182–183, 702/145–146; 324/137, 654; 73/112.01, 73/112.05, 114.26

See application file for complete search history.

(56) References Cited

U.S. PATENT DOCUMENTS

| | | | | |
|---|---|---|---|---|
| 3,675,017 A | * | 7/1972 | Doyle | 250/340 |
| 3,855,864 A | * | 12/1974 | Douglas | 374/107 |
| 3,984,713 A | | 10/1976 | Presley | |
| 4,008,616 A | * | 2/1977 | Murray | 374/112 |
| 4,015,476 A | * | 4/1977 | Roche et al. | 374/104 |
| 4,037,157 A | | 7/1977 | Campbell | |
| 4,095,120 A | * | 6/1978 | Moran et al. | 290/44 |
| 4,358,828 A | | 11/1982 | Reid et al. | |
| 4,505,150 A | * | 3/1985 | Seymour et al. | 73/112.06 |
| 4,764,025 A | * | 8/1988 | Jensen | 374/144 |
| 4,804,844 A | * | 2/1989 | Lee | 250/338.3 |
| 4,814,704 A | | 3/1989 | Zerrien, Jr. et al. | |
| 4,902,970 A | | 2/1990 | Suquet | |
| 4,967,153 A | | 10/1990 | Langley | |
| 5,170,365 A | | 12/1992 | Collopy et al. | |
| 5,203,632 A | * | 4/1993 | Fisher et al. | 374/144 |

(Continued)

FOREIGN PATENT DOCUMENTS

DE    197 29 981    1/1999

(Continued)

OTHER PUBLICATIONS

Optical semiconductor blade vibration monitoring system for gas turbine engine; Kawasima, T.; Iinuma, H.; Minagawa, N.; Instrumentation and Measurement Technology Conference, 1994. IMTC/94. Conf. Proc. 10th Anniversary. Advanced Technologies in I & M., 1994 IEEE; Digital Object Identifier: 10.1109/IMTC.1994.352026; Pub.1994, pp. 601-604, vol. 2.*

(Continued)

*Primary Examiner* — Cuong H Nguyen (74) *Attorney, Agent, or Firm* — Nixon & Vanderhye, P.C.

(57) ABSTRACT

A method (and corresponding apparatus) for monitoring gas turbine blades. The output from an eddy current sensor monitoring the movement of turbine blades past the sensor is processed to determine when the signal train from the sensor omits a signal or pulse corresponding to one of the shaft's full complement of blades. The signal processor compares sensed blade periods with average blade periods.

21 Claims, 7 Drawing Sheets

U.S. PATENT DOCUMENTS

| | | | |
|---|---|---|---|
| 5,226,731 A * | 7/1993 | Allen | 374/124 |
| 5,400,268 A | 3/1995 | Katsuda et al. | |
| 5,541,859 A | 7/1996 | Inoue et al. | |
| 5,559,705 A | 9/1996 | McClish et al. | |
| 5,703,283 A | 12/1997 | McClish et al. | |
| 5,747,680 A | 5/1998 | McArthur | |
| 5,942,893 A * | 8/1999 | Terpay | 324/207.18 |
| 6,225,770 B1 | 5/2001 | Heinrich et al. | |
| 6,462,535 B1 | 10/2002 | Schwabe | |
| 6,786,635 B2 * | 9/2004 | Choi | 374/153 |
| 6,796,709 B2 * | 9/2004 | Choi | 374/102 |
| 7,018,094 B1 * | 3/2006 | Bates | 374/121 |
| 7,822,576 B2 * | 10/2010 | Flint et al. | 702/182 |
| 7,856,337 B2 * | 12/2010 | Kulczyk et al. | 702/145 |
| 2002/0125880 A1 | 9/2002 | Murai et al. | |
| 2004/0083800 A1 | 5/2004 | Yonezawa et al. | |
| 2005/0127905 A1 | 6/2005 | Proctor et al. | |
| 2006/0015288 A1 | 1/2006 | Ai et al. | |
| 2007/0044548 A1 | 3/2007 | Ishizuka et al. | |
| 2009/0177363 A1 * | 7/2009 | Kulczyk et al. | 701/100 |
| 2009/0177434 A1 * | 7/2009 | Kulczyk et al. | 702/145 |

FOREIGN PATENT DOCUMENTS

| | | | |
|---|---|---|---|
| DE | 197 36 712 | | 2/1999 |
| DE | 100 17 107 | | 10/2001 |
| EP | 0 310 823 | | 4/1989 |
| EP | 0 169 670 | | 3/1993 |
| EP | 1 189 065 | | 3/2002 |
| EP | 0 846 951 | | 9/2002 |
| EP | 1 564 559 | | 8/2005 |
| EP | 2073019 A3 * | | 10/2009 |
| GB | 1386035 | | 3/1975 |
| GB | 2198241 | | 6/1988 |
| GB | 2223103 | | 3/1990 |
| GB | 2265221 | | 9/1993 |
| GB | 2 281 624 | | 3/1995 |
| GB | 2414300 | | 11/2005 |
| GB | 0525573.2 | * | 12/2005 |
| GB | 2455797 B | * | 4/2010 |
| WO | WO 92/19977 | | 11/1992 |
| WO | WO 00/08475 | | 2/2000 |
| WO | WO 01/77692 | | 10/2001 |
| WO | WO 03/070497 | | 8/2003 |

OTHER PUBLICATIONS

Diagnostic information fusion: requirements flowdown and interface issues; Goebel, K.; Krok, M.; Sutherland, H.; Aerospace Conference Proceedings, 2000 IEEE ; vol. 6 ; Digital Object Identifier: 10.1109/AERO.2000.877891 Publication Year: 2000 , pp. 155-162 vol. 6.*

IEEE Standard Definitions for Power Switchgear; IEEE Std C37.100-1992; Digital Object Identifier: 10.1109/IEEESTD.1992.106978 Publication Year: 1992.*

Development of instrumentation to capture unsteady & flutter phenomena in the fan rotors of Gas Turbine Engines; Jha, B.K.; Rao, A.N.V.; Pratap, A.; Rao Mohana, T.; Singh, A.K.; Khorikov, A.A.; Instrumentation and Measurement Technology Conf. (I2MTC), 2011 IEEE; Digital Object Identifier: 10.1109/IMTC.2011.5944006; Pub. Yr.: 2011, • pp. 1-8.*

Related U.S. Appl. No. 12/318,029, filed Dec. 19, 2008, Kulczyk et al.

Related U.S. Appl. No. 12/318,032, filed Dec. 19, 2008, Kulczyk et al.

Official Action dated Jan. 12, 2010 in U.S. Appl. No. 12/318,029.
UK Search Report dated Apr. 8, 2008 for GB 0725076.4.
UK Search Report dated Mar. 27, 2008 for GB 0725078.0.
UK Search Report dated Mar. 25, 2008 for GB 0725072.3.
UK Search Report dated Mar. 26, 2008 for GB 0725073.1.
EP Search Report dated Sep. 23, 2009 for EP 08254075.8.
EP Search Report dated Apr. 16, 2009 for EP 08254075.8.
EP Search Report dated May 4, 2009 for EP 08254077.4.
EP Search Report dated May 4, 2009 for EP 08254078.2.
EP Search Report dated May 4, 2009 for EP 08254076.6.

* cited by examiner

Block diagram of the predictor-limiter measuring system

METHOD AND APPARATUS FOR MONITORING GAS TURBINE BLADES

This application claims priority to Great Britain Application No. 0725073.1, filed 21 Dec. 2007, the entire contents of which are hereby incorporated by reference.

The present invention is concerned with method and apparatus for monitoring gas turbine blades, in particular for monitoring blades such as compressor blades mounted on the gas turbine shaft in such a way that they can swivel relative to the shaft on which they are mounted. Embodiments of the invention can be used to monitor the health of the compressor blades mounted on a gas turbine, and as part of arrangements for monitoring the speed of rotation of a gas turbine shaft.

Particular preferred embodiments of the invention allow one to detect when a blade may be damaged or worn. Information on damaged or worn blades is very important to the gas turbine user because it could affect operation of the turbine. This type of damage could easily happen when a small metal object is ingested by the turbine inlet and passes to the compressor where it could cut or bend the tips of several blades. As a result of this damage, the efficiency of the turbine would be reduced and the turbine could suffer severe vibrations due to the lost balance.

The detection of damaged or worn blades may also be used to improve the accuracy of arrangements which monitor the movement of the turbine blades to determine the speed of rotation of the shaft on which the blades are mounted.

The speed of a rotating gas turbine shaft can be monitored by monitoring the movement of the electrically conductive blades through a constant magnetic flux pattern using sensors such as those described in, for example, GB 2,265,221, GB 2,223,103, U.S. Pat. No. 3,984,713 and GB 1,386,035. The sensor monitors the changes in a magnetic field generated by eddy currents induced in a blade as it passes through a constant magnetic field. It is also possible to use a magnetic field generated by an a.c. supply to a coil. The passage of each blade generates a probe signal pulse and the probe signal train is used to calculate the rotational speed of the shaft by measuring the time between successive pulses, or counting a number of pulses in a fixed time. Preferred embodiments of the invention easily and effectively compensate for missing pulses which arise when a signal train omits a pulse corresponding to gas turbine's full complement of blades. Such so-called "missing pulses" situation may arise because of sensing errors, or deterioration and/or breakage of a blade or blades.

The present invention provides a method as defined in the independent claims to which reference should now be made. Preferred features of the invention are defined in the dependent claims.

Preferred embodiments of the invention of the subject application provide an effective method of identifying that gas turbine blade pulses or signal peaks are missing. This can be used both to monitor the health of the blades and for compensating for such errors in the use of the sensed signals to determine the gas turbine's speed.

Known methods and apparatus for monitoring the speed of rotation of a gas turbine shaft, operate by measuring the time period between successive pulses corresponding to successive blades, and dividing it by the known separation between the blades. However, if the pulse corresponding to a particular blade is missing, the respective time period will not correspond to the known separation between two adjacent blades. For example, if a single blade pulse is missing then the separation between blade pulse signal will correspond to double the separation between two adjacent blades. Failure to pick up that pulses are missing and to then compensate for missing pulses could then have a potentially dramatic effect on the calculated speed as the distance would be wrong.

An important advantage of the invention is that it allows one to detect when a blade may be damaged or worn. Information on damaged or worn blades is very important to the gas turbine user because it could affect operation of the turbine. This type of damage could easily happen when a small metal object is ingested by the turbine inlet and passes to the compressor where it could cut or bend the tips of several blades. As a result of this damage, the efficiency of the turbine would be reduced and the turbine could suffer severe vibrations due to the lost balance.

Presently, damaged or worn blades are detected by vibration sensors which pick up the vibrations which arise when a sufficient number of blades is/are damaged for the turbine to be unbalanced. When the vibration level is too high a pre-set alarm trips and stops the turbine. However it is important to know about the damage to the blades as soon as possible to avoid damage to other parts of the turbine such as bearings. The subject invention could be part of an engine health monitoring system which detects damaged blades and provides information well before the dangerous vibration level is reached It is possible to envisage that such a monitoring system could evaluate the severity of the blade damage by changing the level of detection of the receiving pulse amplitude until the condition of 'missing pulse' occurs. Since the pulse amplitude depends on the air gap between the tip of the blade and the sensor, the damage to the blade will result in a larger air gap and therefore smaller signal amplitude. The monitoring system should be able to detect not only impact damage but also any unusual slow wear and erosion of the tip of the blades affecting only some of the blades.

Preferred embodiments of the invention are particularly advantageous in monitoring gas turbine blades whose tips can more relatively to each other. They allow for a fast and accurate measurement which compensates for the errors arising from such movement.

Preferred embodiments of the present invention will be described, by way of example only, with reference to the attached figures. The figures are only for the purposes of explaining and illustrating preferred embodiments of the invention and are not to be construed as limiting the claims. The skilled man will readily and easily envisage alternative embodiments of the invention in its various aspects.

In the Figures:

FIGS. 1a and 1b are a schematic illustration of a speed sensor set up to determine the time intervals between successive tips of the blades of a turbine as they move past the sensor, in which FIG. 1a illustrates the sensor set-up and FIG. 1b illustrates the output signal train;

FIG. 3 is a diagram illustrating the effect of a missing pulse or blade and blade tip movement relevant to each other (i.e. so-called "blade jitter") on the blades of a turbine such as that of FIG. 1a;

In a preferred embodiment of the present invention, the speed of a gas turbine shaft having, say, twenty-nine compressor blades mounted thereon is calculated based on measurements from a speed sensor (or speed sensors) such as the eddy current sensor described in GB 2,265,221. The sensor(s) produce a signal when a blade passages them in the manner described in GB 2,265,221. Data processing coupled to the sensor(s) output either measure the time interval between the passage of successive sensed blades, or the time interval between the passage of a blade past two sensors separated by a known distance. Passage of the blade(s) past the sensor(s) causes changes in the voltage or current induced in the sensor output. The sensors have their output connected to data processing apparatus. The data processing apparatus may be a digital engine control unit, or a separate data processing unit delivering signal to a digital engine control unit.

Referring to FIG. 1 showing a bladed gas turbine shaft 1, a shaft 4 has a disc 3 connected thereto. The disc has twenty-nine blades 2 (not all shown) fixed thereto at equal points spaced around the shaft's circumference. The base of each blade 2 is fixed to the disc by a pin (not shown). As discussed in more detail below, each blade 2 can therefore rotate about its pin in a range of up to as much as about +/−20 degrees in certain circumstances. This rotation is known as jitter and can give rise to varying time measurements.

A speed sensor 5 (see FIG. 1a) is located near the path of the rotating blades and notes the passage of each blade tip as it passes the sensor. The sensor produces a pulse or a signal peak (see FIG. 1b) as a blade tip passes it.

In this text, reference is made to signals, signal pulses or peaks. For a magnetic sensor, what happens is that as a features approaches and then moves away from the sensor, a signal similar to a single sine wave results (i.e. having positive and negative peaks). The position of the signal or pulse for the purposes of the described embodiments is usually taken to be the zero crossing point between the positive and negative peaks. Blade periods are measured between successive zero crossings.

The fixing of the compressor blades of a gas turbine by a pin attachment (see FIG. 1a) means that the centrifugal, pressure and friction forces which act on moving blades can cause the blade tips to move relative to each other and/or the shaft.

It is this effect which the inventors have named "blade jitter" and which is referred to as blade jitter in this document.

Figure 1A:
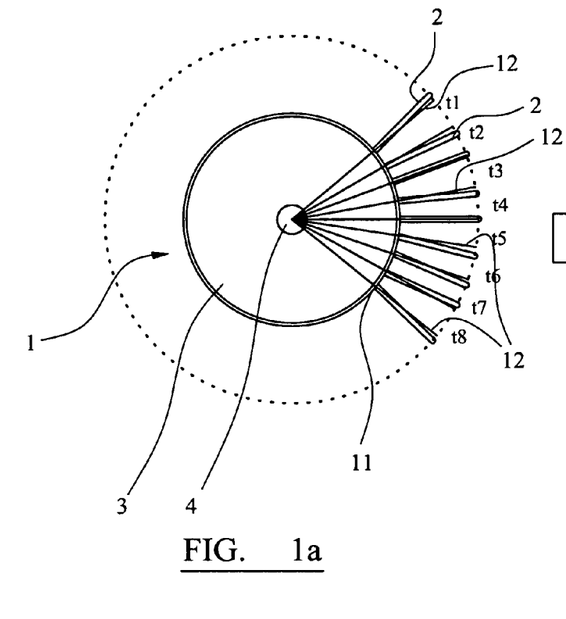
Figure 1B:
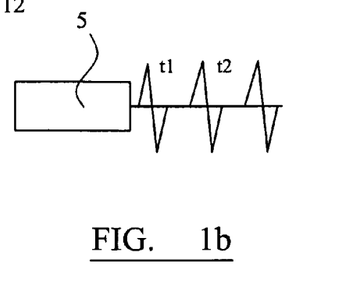
Figure 2:
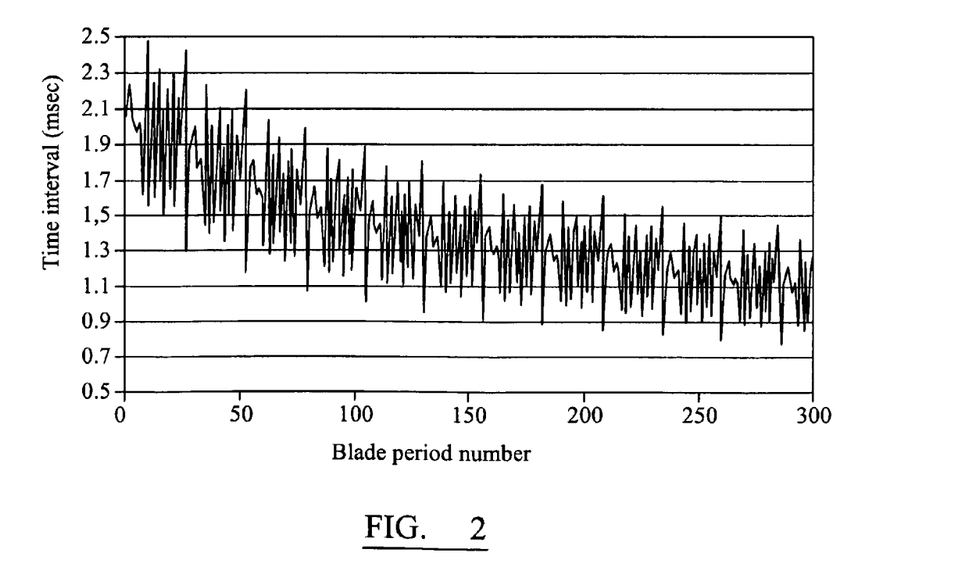
FIG. 2 illustrates a variation of time intervals between consecutive blades when a shaft such as that of FIG. 1 is accelerating at a rate of about 2000 rpm/s from a speed about 1000 rpm.

As shown in FIG. 1a, jitter is caused by blades 2 (or blade tips) not being in their nominal equally spaced positions 12. This offset from the nominal position results from the fact that blades are each mounted on a pin though their base 11 and the forces acting thereon can cause the blades 2 to pivot around or swivel about their respective pin. This movement or jitter can cause, even at a constant rotational speed, the blade period times measured from blade to blade to differ from one blade to the next causing it to appear as if the rotational speed is constantly changing. The speed change is not smooth and continuous, but appears as a repetitive variability or error as shown in FIG. 2.

Figure 4:
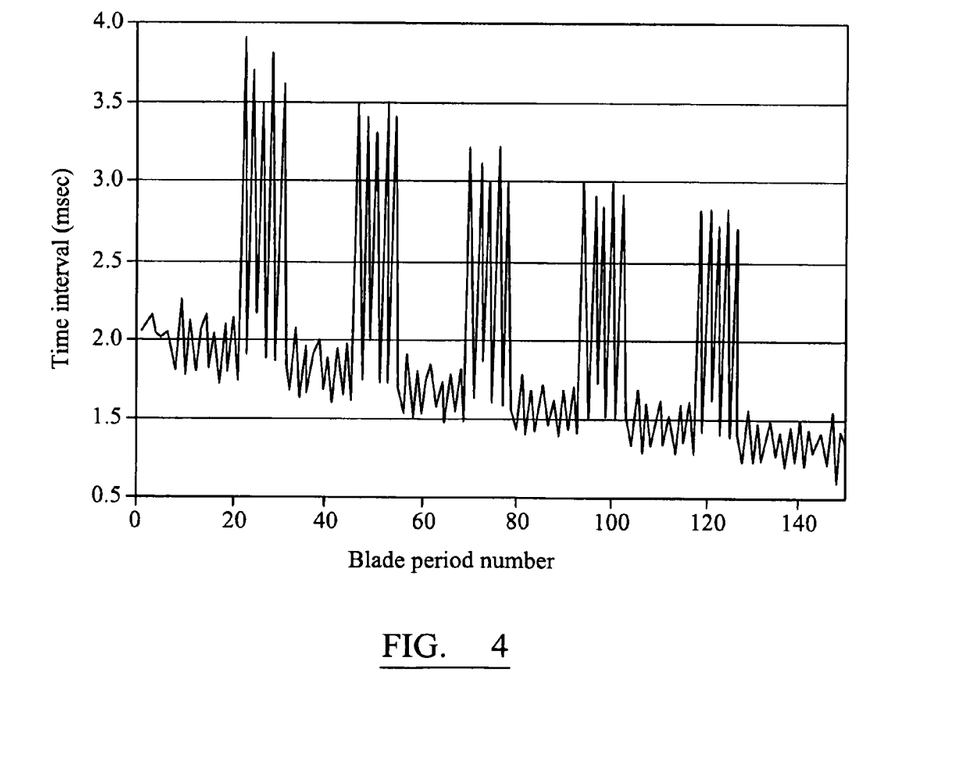
FIG. 4 illustrates a variation of the intervals between consecutive blades for the shaft of FIG. 1, when it has five missing blades or blade pulses, accelerating at 2000 rpm/s from a speed of 100 rpm.

A data processor (not shown) is coupled to the speed sensor 5 to receive as an input the sequence of pulses generated by the sensor. There may be significant time variation errors produced by the jitter effect, and missing pulses, as illustrated in FIGS. 2 and 4.

To simplify the following description of the preferred embodiment, normalised times will be used, where '1' shall represent the nominal time period between perfectly positioned blades passing the sensors.

Figure 3:
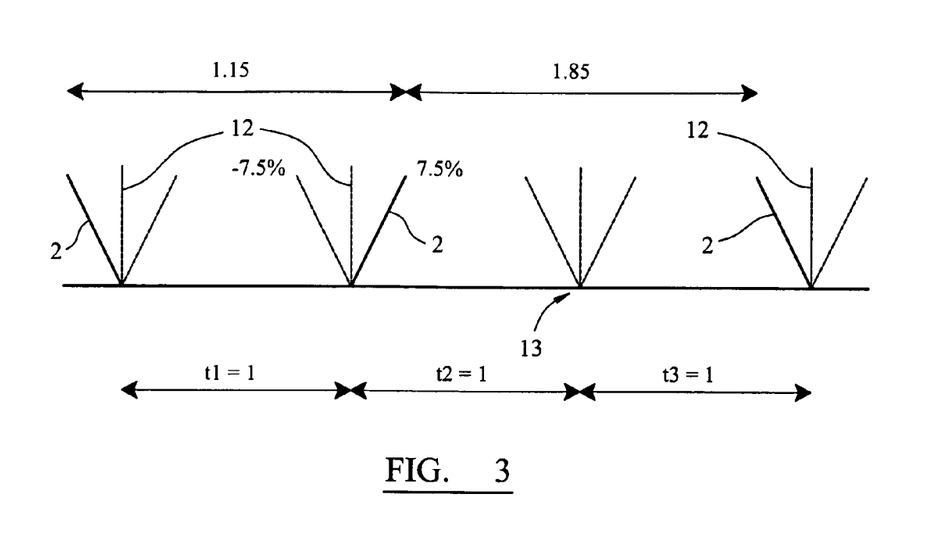

For example, if there is assumed to be ±7.5% blade jitter on each blade (i.e. blade jitter expressed as a percentage of nominal or theoretical blade separation) as shown in FIG. 3, this will cause the blade period to vary between a minimum blade period of:

$$BP_{min}=1-2\times0.075=1-0.15=0.85 \qquad (1)$$

and a maximum blade period of:

$$BP_{max}=1+2\times0.075=1+0.15=1.15 \qquad (2)$$

However, when one missing pulse (13) is present, as shown in FIG. 3, the normalised minimum blade period is calculated by:

$$BP_{min}=1+1-(2\times0.075)=1.85 \qquad (3)$$

and a maximum blade period is calculated by:

$$BP_{max}=1+1+2\times0.075=2.15 \qquad (4)$$

Therefore, the presence of a single missing pulse gives a nominal normalised blade period of 2; two missing pulses give a nominal BP of 3; and so on.

In the following discussions of methods embodying the invention, 'AV' is used for the number of blade periods over which an average blade period is taken, and 'M' is the total number of missing pulses present in that sample taken over AV blade periods (see FIGS. 5 and 7).

Figure 5:
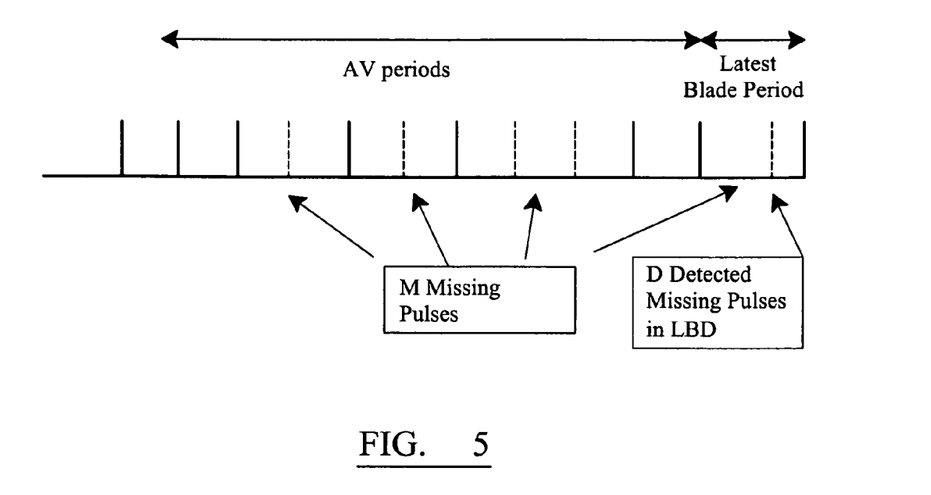
FIG. 5 is a diagram illustrating a pulse or signal train corresponding to the sensing of a position of a turbine blade having a number of missing pulses corresponding to, for example, missing blades, or damaged blades resulting in corresponding signal pulse.

One method of detecting missing pulses Is based on finding the ratio, R, of the latest blade period (LBP) to the average blade period over the last AV periods of measurements ($BP_{AV}$) (see FIG. 5). In this method, the AV number of periods does not include the latest blade period.

As each successive blade tip passes the sensor 5, a pulse is generated and the attached circuitry measures the latest blade period LBP (the elapsed time between successive blades passing the sensor) and these values are stored in a memory.

When a predetermined number AV of blades have been detected by the sensor, an average blade period over the AV periods is calculated.

If there are 'M' missing pulses in a compressor disc having 'K' blades and in the latest blade period, there are 'D' missing pulses (see FIG. 5), the latest blade period (LBP) is given by:

$$LBP=D+1\pm2\times j \qquad (5)$$

where: j is the maximum value of blade jitter

The total of the blade periods to be averaged is:

$$T=AV+M\pm2\times j \quad (6)$$

The average blade period over the last AV periods is then:

$$BP_{AV}=T/AV \quad (7)$$

The values of LBP and $BP_{AV}$ are then used to calculate the Ratio, R, of the latest blade period (LBP) to the average blade period over the last AV periods of measurements ($BP_{AV}$) is then:

$$\text{Ratio}=LBP/BP_{AV}=(LBP/T)\times AV \quad (8)$$

This ratio is at a maximum when LBP has its largest value and T has its smallest value:

$$\text{Ratio}_{MAX} = AV \times \frac{D+1+2\times j}{AV+M-2\times j} \quad (9)$$

This ratio is at a minimum when LBP has its smallest value and T has its largest value:

$$\text{Ratio}_{MIN} = AV \times \frac{D+1-2\times j}{AV+M+2\times j} \quad (10)$$

Figure 6:
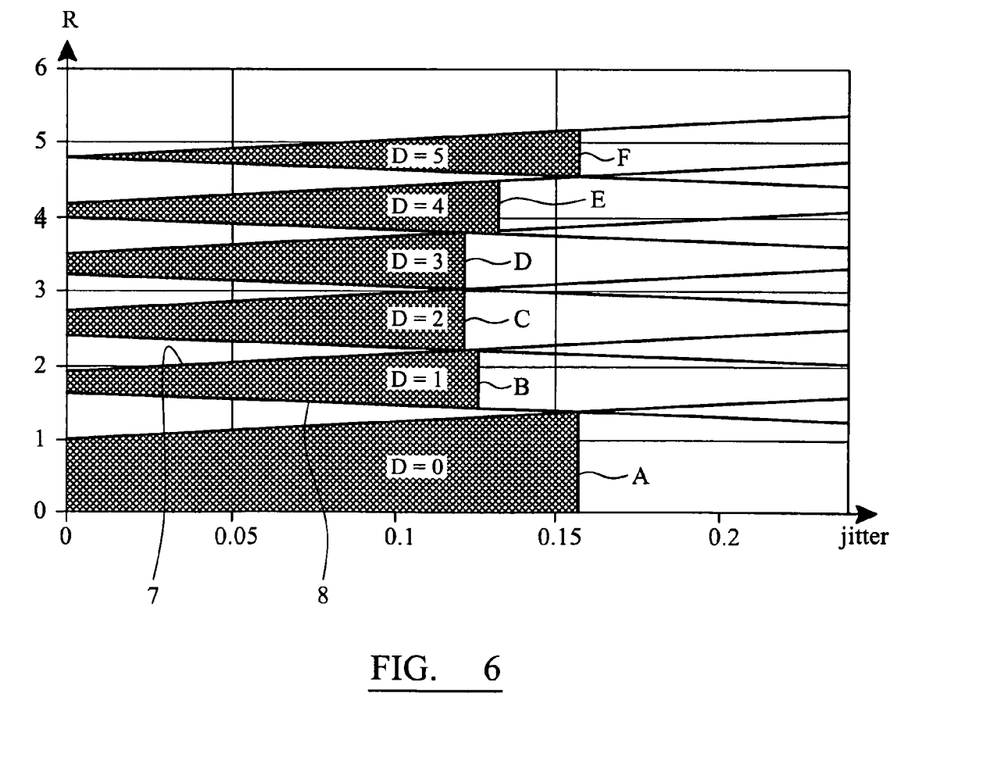
FIG. 6 is a graph showing dependence of the ratio of the latest blade period time to the average blade period time over the last AV periods on the total number of missing pulses, M, for a given number of detected pulses, D, in the latest blade period, as a function of jitter.

By way of an example of the detection of the total number of missing pulses in AV blade periods, equations (9) and (10) set out above have been used to calculate the $\text{Ratio}_{max}$ and $\text{Ratio}_{min}$ for various values of blade jitter and various values of D (number of missing pulses in last blade period) and M (number of missing pulses in a single revolution of compressor disc). FIG. 6 is a graph showing the relationship between the Ratio, R, and the jitter value, calculated for: AV=20, D=0 to 5 and M=0 to 5.

For each value of D, the 'relevant lines' are the outermost lines (e.g. lines 7, 8 for D=1, where 7 is the line corresponding to D=1, M=5, minimum, and 8 is the line corresponding to D=1, M=1, maximum) plotted for that value of D, (see FIG. 6).

As each successive blade passes sensor 6, the value of R (see equation 8) for the latest blade period is calculated by the system's data processors FIG. 6 illustrates the calculations carried out by software implementing the invention to create a look-up table listing the number of missing pulses which correspond to calculated vales of the ratio R and values of blade jitter.

If the calculated value of R would, if plotted on the graph of FIG. 6, lie in the region before the relevant lines for one D value cross those for another D value—i.e. where the value of R lies within one of hatched regions A, B, C, D, E or F of FIG. 6, the value of D can be ascertained from the graph (or a look-up table/database duplicating the graph and/or the equations underlying the graph) as there is only one possible region or outcome.

For example (see FIG. 6), if when AV=20 and M is between 0 and 5, the value of jitter is 0.12, and the calculated value of the ratio, R, is 1.9, R falls within hatched region B of FIG. 6, the graph shows that the value for D (missing pulses in latest blade period) is therefore 1. However, if when AV=20 and M is between 0 and 5 and the value of jitter is say 0.2, the value of the ratio R will fall to the right of hatched region B, beyond the maximum allowable jitter limit. As a result, D cannot be ascertained from the graph of FIG. 6. Experiments suggest that jitter values are not usually greater than about 0.1, so a look-up table duplication in software of the arrangement illustrated in the graph of FIG. 6 can be used as situations with sufficiently large jitter values for the look-up table not to work are unlikely to arise.

For a turbine compressor disc having, say, twenty-nine blades, AV must be less than 29-M, but the larger it is the better resolution it has, so 20 is a compromise, The M and D values are selected as 0 to 5 because, in practice, when 5 out of 29 blades are damaged, turbine vibrations are so large that the turbine must be shut down. M and/or D could however be equal to 6, 7, 8 or 9.

To simplify the process described above of determining the value of D, the value of D that corresponds to a range of values of R for the latest blade period can put in a table format as shown below in Table 1 below. Software implementing the invention would use a look-up table corresponding to such a table.

TABLE 1

Calculation of D for given ranges of R

| Range of values of ratio | Max. jitter value | No. of missing pulses, D |
|---|---|---|
| 0 < R < 1.34 | 0.156 | 0 |
| 1.34 < R < 2.18 | 0.128 | 1 |
| 2.18 < R < 2.98 | 0.12 | 2 |
| 2.98 < R < 3.75 | 0.12 | 3 |
| 3.75 < R < 4.49 | 0.131 | 4 |
| 4.49 < R | 0.159 | 5 |

As described above, K is only possible to determine D for a value of R where the jitter value does not exceed the given maximum jitter value given in Table 1, which corresponds to the jitter limit of the hatched regions A to F (FIG. 6). If the value of blade jitter exceeds this maximum permissible jitter value, the calculations cannot be performed.

The maximum value of jitter for a given turbine is established during a separate test. In practice, the blade jitter experienced by the turbine blades during shaft rotation is much smaller than the limits given in Table 1.

To establish the number of missing pulses, M, in a full revolution of the bladed shaft, the calculations have to be performed K–ΣD times, where: K is the number of blades attached to the compressor disc, and ΣD is the sum of detected missing pulses in the Latest Blade Period. D is measured during every measurement, so the sum of Ds should give M, but the calculations are performed K–ΣD times to try and avoid counting the same Ds twice.

Figure 7:
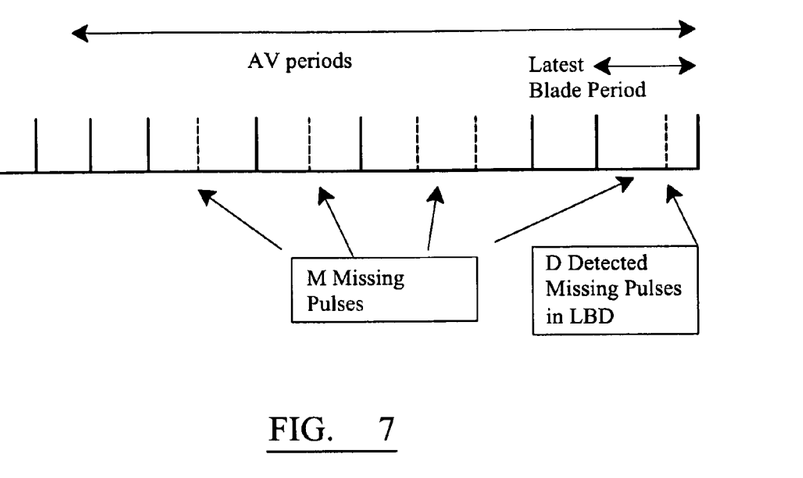
FIG. 7 is a diagram showing the presence of M missing pulses in AV periods, with D missing pulses being present in the latest blade period and the AV periods including the latest blade period.

In a second method embodying the invention, for detecting the presence of missing pulses, the number of blade periods to be averaged, AV, includes the Latest Blade Period as shown in FIG. 7. Therefore, the total AV time period may include more missing pulses than in the previously described method as, in the subject method, AV includes both any missing pulses M and any missing pulses D.

In this method, the cumulative total of the blade periods to be averaged is:

$$T=AV+(M-D)\pm2\times j \quad (11)$$

The average blade period is calculated by:

$$BP_{AV}=T/AV \quad (12)$$

The ratio of the latest blade period to the average blade period over the last AV periods of measurements is then calculated by:

$$\text{Ratio}=LBP/BP_{AV}=LBP/T\times AV \quad (13)$$

Again, this ratio is at a maximum when LBP has its largest value and T has its smallest value and the ratio is at a minimum when LBP has its smallest value and T has its largest value.

$$Ratio_{MAX} = AV \times \frac{D+1+2 \times j}{AV+M-D-2 \times j} \quad (14)$$

$$Ratio_{MIN} = AV \times \frac{D+1-2 \times j}{AV+M-D+2 \times j} \quad (15)$$

The same process as that described for the above method is then used to ascertain the values of D and M for use in calculating the shaft rotational speed.

When the blade jitter values are larger than the maximum permissible values listed in Table 1, or it is possible that more than 5 missing pulses may be present in K periods, it may be more reliable to use a method based on the measurements of blade to blade times using the predictor-limiter method of GB 2,414,300. The predictor limiter-method removes missing pulses blade periods and therefore blade to blade time measurements give us a Reference Period.

The predictor-limiter arrangement of GB 2,414,300 works by predicting blade time periods from historical sensed blade time periods. Only sensed blade time periods which fall within a defined range of acceptable values are used to calculate predicted time periods with blade time periods outside the range of acceptable values being ignored as likely to correspond to a missing pulse or blade. If a sensed period is outside the _acceptable range of values, its predicted value is used in place of that sensed value to predicts its future value. The predicted blade time periods are used as the output measure of blade periods. The sensed blade time periods are only used for predictions. It is the predicted blade periods which are used as the measure of blade time period which can then be used, to monitor or to measure shaft speed or, as described below, determine missing pulses to calculate the speed of the shaft.

Using this method, the number of missing pulses present in one period is obtained by calculation of the ratio:

$$R = \frac{\text{Latest Blade Period}}{\text{Reference Period}} \quad (16)$$

The latest blade period is the elapsed time between pulses produced by successive blades passing a single sensor and is calculated by:

$$LBP = D + 1 \pm 2 \times j \quad (17)$$

where: D is the number of missing pulses, and
j is the jitter value.

The Reference Period is obtained using predictor-limiter calculations as described in more detail in GB 2,414,300 whose contents are hereby incorporated in their entirety by way of reference. In normalised notation, the reference period of equation 16 is equal to 1, hence the ratio of Equation 16 is simply equal to the latest blade period.

The calculations must be performed K−ΣD times to establish M as for method 1 described above.

Figure 9:
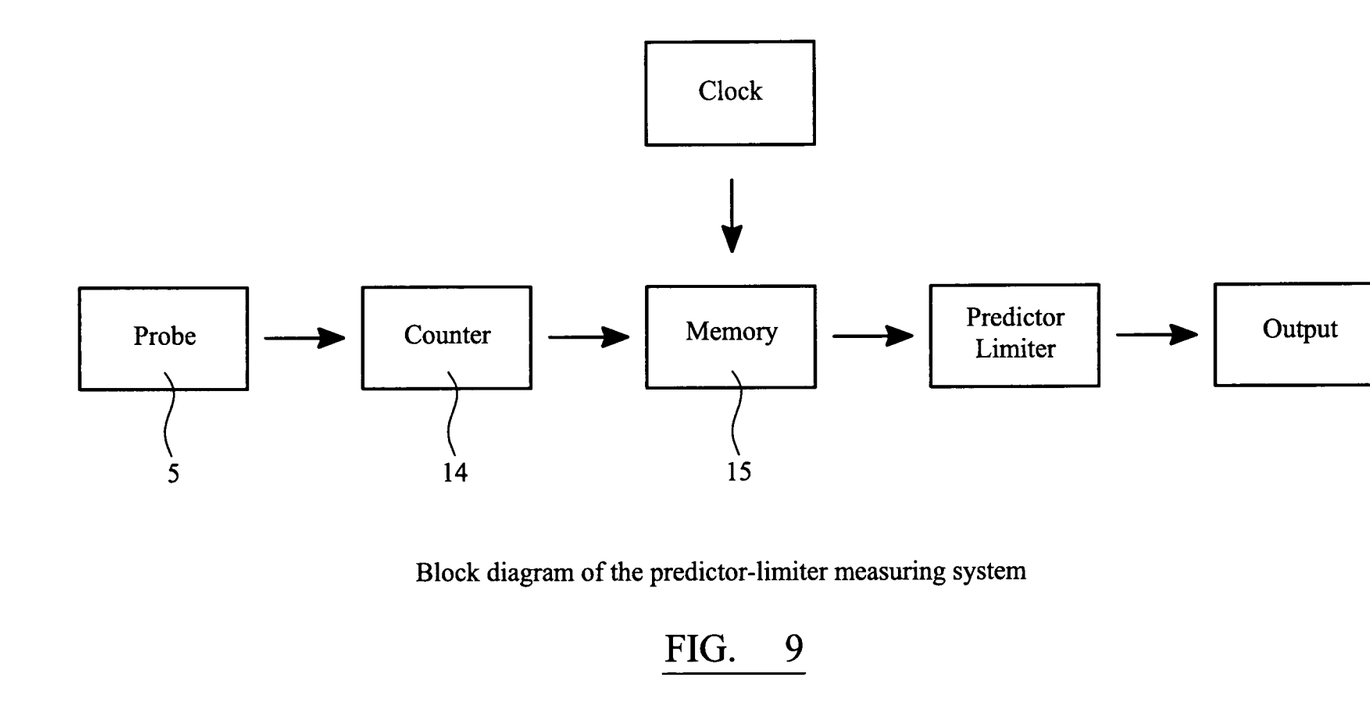
FIG. 9 is a flow diagram illustrating the method of an embodiment of the present invention.

As described above, a data processor 6 (see FIGS. 1a and 9) coupled to the speed probe 5 receives as an input the sequence of pulses generated by the probe. The data processor includes a counter 14 which determines the time interval between successive signal pulses. These are stored in a memory 15.

When there are sufficient time interval values stored in the memory, a time interval trend time is calculated from the stored time interval values.

The number of required historical values used to produce the trend line must be optimised to provide accurate tracking speed and response to rapid speed changes. The number of historical values used to calculate the trend line is the length (a number of averaged periods) of the trend line. A short trend line will result in largely noisy predicted values, because it is averaging over a small number of data points. A long trend line will cause slow response in case of speed changes and a large error in case the average slope of the time interval curve is not linear. The length of the trend line must be set for each type of engine using its experimental data.

The 'Length' of the predictor is determined by the time needed for the averaged value of noise to be close to zero. For example, for a turbine shaft with 29 blades the average jitter value is zero after 29 periods, therefore the predictor length should be 29 periods for a system measuring the speed of such a turbine.

For the gas turbine shaft of FIG. 2 having twenty nine blades the linear trend line based on the previous twenty-nine blade periods is then calculated the method of least squares. In other words a straight line is fitted to the twenty nine most recent time intervals stored in the memory and is determined in the form of an equation:

$$y = mx + b \quad (17)$$

where x is the blade period number.

Any of the known trend line generation methods may be used. The trend line also need not be linear. Clearly in certain circumstances the trend line may be a curve (i.e. a quadratic or higher order trend line).

Figure 10:
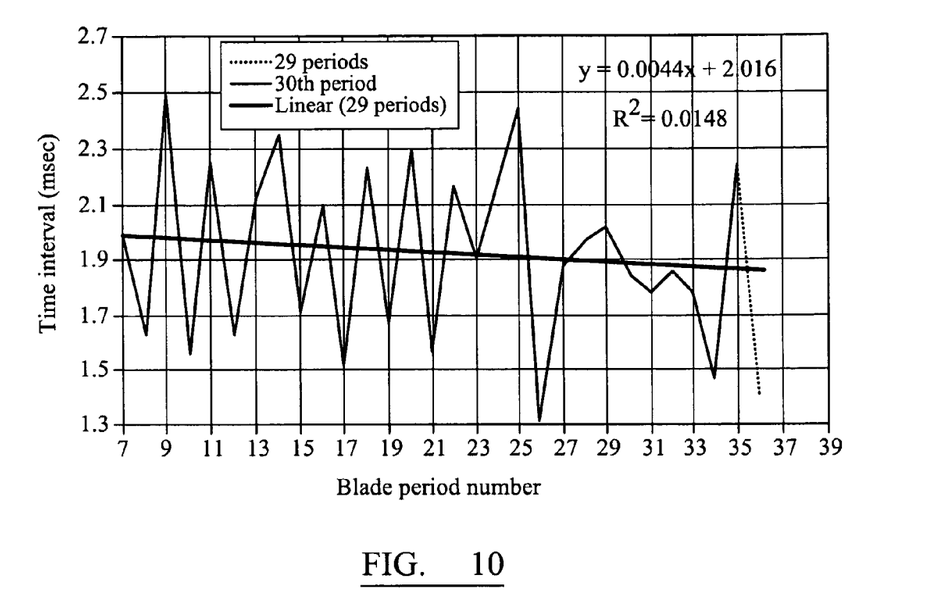
FIG. 10 illustrates the principle of the embodiment of FIG. 9.

For example using the values of FIG. 10 and using the time intervals of periods 7 to 35 to determine the predicted value for the 36$^{th}$ time interval or blade period:

for x=36 y=0.0044*36+2.016

$$y = 1.8576 \quad (18)$$

Next the limiter is applied. For a limiter set at 40% the algorithm looks like follows:
IF the new value is larger than the predicted value times 1.4, OR is smaller than the predicted value times 0.6, THEN the new value is rejected and the predicted value is accepted as a new value. ELSE a new value is accepted.
e.g. (See FIG. 10)

| predicted value | new value | accepted value | output value |
|---|---|---|---|
| 1.8576 (7-35) | 1.407 | 1.407 | 1.8576 |
| 1.8576 | 3.5 | 1.8576 | 1.8576 |
| 1.8576 | 0.7 | 1.8576 | 1.8576 |
| 1.7929 (8-36) | 2.01 | 2.01 | 1.7929 |

Next, the accepted value is used to calculate the next trend line for periods 8 to 36
For the accepted value=1.407
a new trend line is y=−0.0073x+2.063
the predicted value for x=37, y=1.7929
and the above process is repeated.

Length (a number of averaged periods) of the trend line
The chosen value of the limiter is determined by the value of maximum jitter. During normal operation the limiter should not limit the jitter but should detect missing pulses and spurious pulses.

Figure 11:
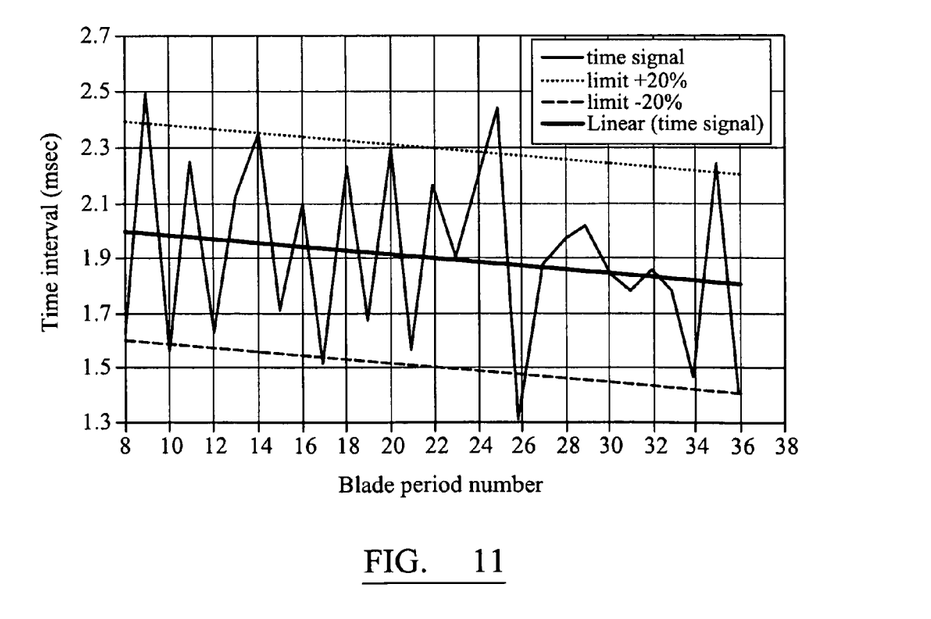
FIG. 11 illustrates the principle of FIG. 10 using a limiting range of +/−20%.

The limit shown on FIG. 11 was set to +/−20%. For such a level of the limit the signal from several periods will be limited i.e. periods 9, 17, 25, 26, 35 resulting in the trend line not following the average speed. For proper time signal tracking shown in FIG. 11 the limiter should be set to +/−30%.

Figure 12:
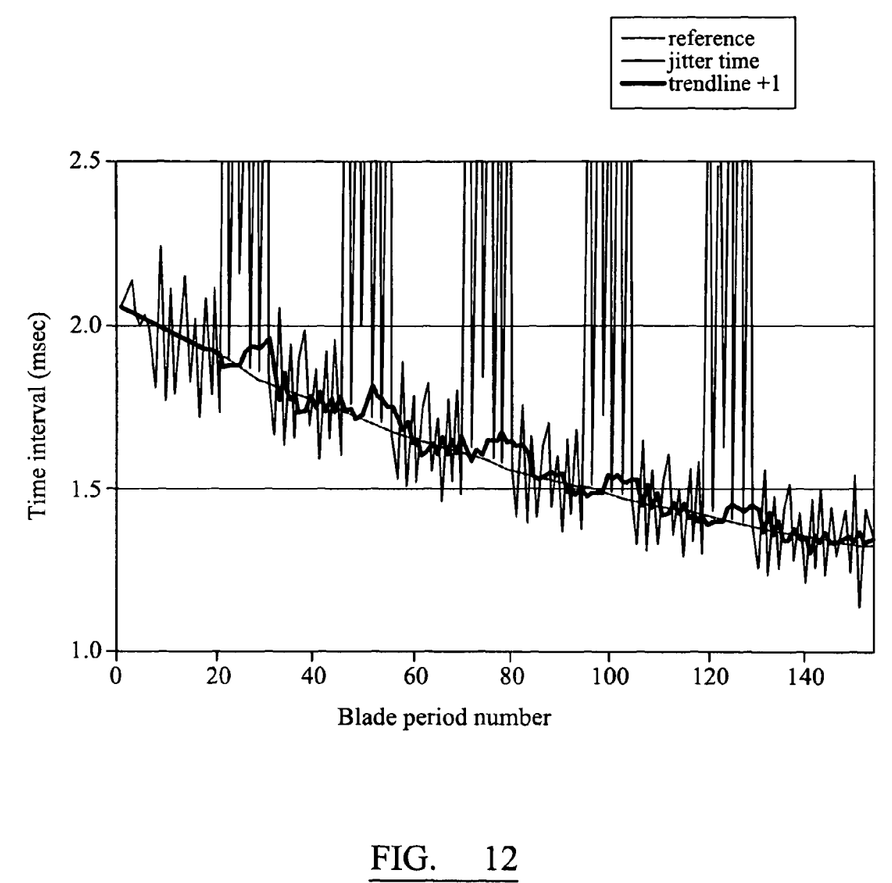
FIG. 12 illustrates an output signal after processing using the embodiment of FIGS. 2 and 9 to 12.

As a result of performing the above described calculations the measured time signal shown in FIG. 11 is transformed at the output and shown in FIG. 12 as 'trendline+1'. In spite of many missing blades the error is less than 6%.

The accuracy of speed calculation depends on the amount of jitter, acceleration/deceleration rate, the length of a trend line and the level of limit.

Figure 8:
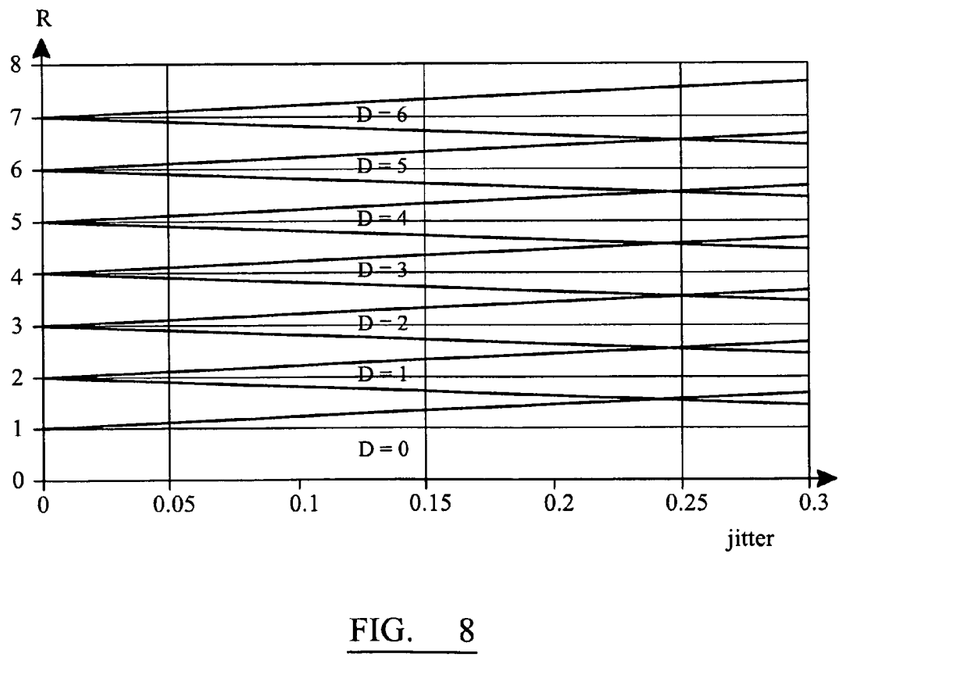
FIG. 8 is a graph showing calculated values of the ratio of the latest blade period time to the average blade period time over the last AV periods for different numbers of detected missing pulses, D, as a function of jitter using the predictor limiter method described in GB 2,414,300.

The results of calculations of the ratios of equation 16 is shown in FIG. 8 and below in Table 2.

TABLE 2

Calculation of D for ranges of the ratio, R

| Range of Values of Ratio | Max. Jitter range | No. of missing pulses D |
|---|---|---|
| 0 < R < 1.5 | 0.25 | 0 |
| 1.5 < R < 2.5 | 0.25 | 1 |
| 2.5 < R < 3.5 | 0.25 | 2 |
| 3.5 < R < 4.5 | 0.25 | 3 |
| 4.5 < R < 5.5 | 0.25 | 4 |
| 5.5 < R < 6.5 | 0.25 | 5 |
| 6.5 < R | 0.25 | 6 |

As with the previous methods of determining the number of missing pulses, the value of D is only admissible where the maximum blade jitter value is not exceeded. In practice, blade jitter of 0.25 is never observed, hence the value of D should always be ascertainable from Table 2. Software implementing the invention can therefore work with an equivalent look-up table.

Embodiments of the invention could include a determination of the jitter associated with each blade by measuring the blade to blade separation. This could either be done for a particular set of gas turbine blades on a test bed, or during the initial running of an engine when it is unlikely that blades will be sufficiently worn or damaged for there to be any missing pulses to affect the blade to blade separation measurements using time periods past the sensor and the known nominal blade to blade separation. Tests suggest that the where the blade jitter is up to about 12%, the first method described above in connection with FIG. 6 is likely to work best. For larger values of blade jitter where the system calculation illustrate in FIG. 6 would not work because we find ourselves to the right of the hatched area in FIG. 6, the third method described above in connection with FIG. 8 is likely to be more appropriate. Tests suggest that this third method works for blade jitter values up to about 25% and such high values are unlikely to be exceeded. Turbine tests carried out by the inventors never observed jitter values exceeding 20%. t Whichever method of determining the number of missing pulses present is employed, the result is the total number of missing pulses, M, that result from a complete revolution of the bladed shaft.

For embodiments of the invention which are used to monitor the health of gas turbine blades, the pulses train could be connected to a variable level pulses detection system. The system would record an average or peak signal amplitude and determine when (and the number of) signals having their amplitude, say, 10%, 20%, 30% etc lower than the reference amplitude and that could be used as an indication of the level of damage to the blades. The relation between level of signal and the level of damage would be established empirically and used to populate a look-up table against which the sensed signal amplitudes could be compared.

Features of preferred embodiments of the invention in its various aspects are set out in the following numbered paragraphs:
1. A method for monitoring gas turbine blades on a rotatable shaft of a gas turbine where the blade tips can move relative to each other, comprising the steps of:
   i) producing a signal train comprising a sequence of signals or pulses, wherein each signal or pulse corresponds to the passage of a blade past a sensor;
   ii) determining the blade time period between successive signals or pulses;
   iii) calculating an average blade period over a plurality of consecutive blade time periods; and
   iv) determining the ratio of a determined blade period to the average blade period.
2. A method according to numbered paragraph 1 for determining whether or not the signal train omits a signal or pulse corresponding to one of the gas turbine shaft's full complement of blades.
3. A method according to any preceding numbered paragraph wherein the determined ratio of a blade period to the average blade period is compared to a number of pre-determined values of said ratio.
4. A method according to numbered paragraph 3, wherein the plurality of consecutive blade periods over which the average blade period is calculated does not include the determined blade period, and wherein the predetermined values of said ratio are bounded by the possible values of the equations:

$$Ratio_{MAX} = AV \times \frac{D + 1 + 2 \times j}{AV + M - 2 \times j}$$

and $$Ratio_{MIN} = AV \times \frac{D + 1 - 2 \times j}{AV + M + 2 \times j}$$

where: $Ratio_{MAX}$ is the upper boundary value of the ratio. $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

5. A method according to numbered paragraph 3, wherein the plurality of consecutive blade periods over which the average blade period is calculated includes the determined blade period, and wherein the pre-determined values of said ratio are bounded by the possible values of the equations:

$$Ratio_{MAX} = AV \times \frac{D + 1 + 2 \times j}{AV + M - D - 2 \times j}$$

$$.Ratio_{MIN} = AV \times \frac{D + 1 - 2 \times j}{AV + M - D + 2 \times j}$$

where: $Ratio_{MAX}$ is the upper boundary value of the ratio. $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

6. A method according to numbered paragraph 1 wherein the average blade period is determining by averaging a series of blade periods signals each representative of a series of measure blade period signals, predicting a value for a first signal from a historical blade period signal value, generating a first calculated blade period signal from the predicted value of the first measurement signal; comparing the measured signal to its predicted value period, and: if the measured signal is within a pre-determined range of acceptable values, using the first measured blade signal to predict a value for a second measured signal blade period;

if the measured signal is outside the pre-determined range of acceptable values, using the first predicted value to predict a second measured signal, and generating a second calculated blade period signal from the predicted value of the second measured signal.

7. A method according to any preceding numbered paragraph further comprising the step of monitoring the amplitude of the signals or pulses.

8. A method for monitoring the health of a gas turbine according to any preceding numbered paragraph.

9. A method according to any preceding numbered paragraph wherein gas turbine is an industrial gas turbine.

10. A method according to any of numbered paragraphs 1 to 7 wherein the gas turbine is a jet engine.

11. A method according to any preceding numbered paragraph wherein the blades are compressor blades.

12. A system for monitoring gas turbine blades on a rotatable shaft of a gas turbine where the blade tips can move relative to each other, comprising:

i) means for producing a signal train comprising a sequence of signals or pulses, wherein each signal or pulse corresponds to the passage of a blade past a sensor;

ii) means for determining the blade time period between successive signals or pulses;

iii) means for calculating an average blade period over a plurality of consecutive blade time periods; and iv) means for determining the ratio of a determined blade period to the average blade period.

13. A system according to numbered paragraph 11 for determining whether or not the signal train omits a signal or pulse corresponding to one of the gas turbine shaft's full complement of blades.

14. A system according to numbered paragraphs 11 or 12 wherein the determined ratio of a blade period to the average blade period is compared to a number of pre-determined values of said ratio.

15. A system according to numbered paragraph 11, wherein the plurality of consecutive blade periods over which the average blade period is calculated does not include the determined blade period, and wherein the pre-determined values of said ratio are bounded by the possible values of the equations:

$$Ratio_{MAX} = AV \times \frac{D+1+2 \times j}{AV+M-2 \times j}$$

and $$Ratio_{MIN} = AV \times \frac{D+1-2 \times j}{AV+M+2 \times j}$$

where: $Ratio_{MAX}$ is the upper boundary value of the ratio; $Ratio_{MIN}$ is the lower boundary value of the ratio; AV is the number of signal pulses or peaks over which the average blade period is calculated M is the number of missing pulses or peaks over a single complete revolution; D is the number of missing pulses or peaks in the determined blade period; and j is the maximum value of blade tip movement relative to the nominal blade position expressed as a fraction of the nominal blade separation.

16. A system according to numbered paragraph 11, wherein the plurality of consecutive blade periods over which the average blade period is calculated includes the determined blade period, and wherein the pre-determined values of said ratio are bounded by the possible values of the equations:

$$Ratio_{MAX} = AV \times \frac{D+1+2 \times j}{AV+M-D-2 \times j}$$

$$Ratio_{MIN} = AV \times \frac{D+1-2 \times j}{AV+M-D+2 \times j}$$

where: $Ratio_{MAX}$ is the upper boundary value of the ratio; $Ratio_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to the nominal blade position expressed as a fraction of the nominal blade separation.

17. A system according to any of numbered paragraphs 11 to 15, further comprising the step of monitoring the amplitude of the pulses or peaks.

18. A system for monitoring the health of a gas turbine according to any of numbered paragraphs 11 to 16.

19. A system according to any of numbered paragraphs 11 to 17 for monitoring the health of an industrial gas turbine.

20. A system according to any of numbered paragraphs 11 to 17 for monitoring the health of a jet engine.

The invention claimed is:

1. A method for monitoring gas turbine blades on a rotatable shaft of a gas turbine where the blade tips can move relative to each other, comprising the steps of:

a. producing a signal train comprising a sequence of signals or pulses, wherein each signal or pulse corresponds to the passage of a blade past a sensor;

b. determining a blade time period between successive signals or pulses;

c. calculating an average blade period over a plurality of consecutive blade time periods; and d. determining a ratio of a determined blade period to the average blade period.

2. A method according to claim 1, for determining whether or not the signal train omits a signal or pulse corresponding to one of the gas turbine shaft's full complement of blades.

3. A method according to claim 1, wherein the determined ratio of a blade period to the average blade period is compared to a number of pre-determined values of said ratio.

4. A method according to claim 3, wherein the plurality of consecutive blade periods over which the average blade period is calculated does not include the determined blade period, and wherein the pre-determined values of said ratio are bounded by the possible values of the equations:

$$Ratio_{MAX} = AV \times \frac{D+1+2 \times j}{AV+M-2 \times j}$$

and $$Ratio_{MIN} = AV \times \frac{D+1-2 \times j}{AV+M+2 \times j}$$

where: $\text{Ratio}_{MAX}$ is the upper boundary value of the ratio, $\text{Ratio}_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

5. A method according to claim 3, wherein the plurality of consecutive blade periods over which the average blade period is calculated includes the determined blade period, and wherein the pre-determined values of said ratio are bounded by the possible values of the equations:

$$\text{Ratio}_{MAX} = AV \times \frac{D+1+2 \times j}{AV+M-D-2 \times j}$$

$$.\text{Ratio}_{MIN} = AV \times \frac{D+1-2 \times j}{AV+M-D+2 \times j}$$

where: $\text{Ratio}_{MAX}$ is the upper boundary value of the ratio, $\text{Ratio}_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to nominal blade position expressed as a fraction of the nominal blade separation.

6. A method according to claim 1, wherein the average blade period is determining by averaging a series of blade periods signals each representative of a series of measure blade period signals, predicting a value for a first signal from a historical blade period signal value, generating a first calculated blade period signal from the predicted value of the first measurement signal; comparing the measured signal to its predicted value period, and:
  if the measured signal is within a pre-determined range of acceptable values, using the first measured blade signal to predict a value for a second measured signal blade period;
  if the measured signal is outside the pre-determined range of acceptable values, using the first predicted value to predict a second measured signal,
  and generating a second calculated blade period signal from the predicted value of the second measured signal.

7. A method according to claim 1, further comprising the step of monitoring the amplitude of the signals or pulses.

8. A method according to claim 1, for monitoring health of a gas turbine.

9. A method according to claim 1, wherein said gas turbine is an industrial gas turbine.

10. A method according to claim 1, wherein the gas turbine is a jet engine.

11. A method according to claim 1, wherein the blades are compressor blades.

12. A system for monitoring gas turbine blades on a rotatable shaft of a gas turbine where the blade tips can move relative to each other, comprising:
  a. means for producing a signal train comprising a sequence of signals or pulses, wherein each signal or pulse corresponds to passage of a blade past a sensor;
  b. means for determining a blade time period between successive signals or pulses;
  c. means for calculating an average blade period over a plurality of consecutive blade time periods; and
  d. means for determining a ratio of a determined blade period to the average blade period.

13. A system according to claim 12, for determining whether or not the signal train omits a signal or pulse corresponding to one of the gas turbine shaft's full complement of blades.

14. A system according to claim 12, wherein the determined ratio of a blade period to the average blade period is compared to a number of pre-determined values of said ratio.

15. A system according to claim 12, wherein the plurality of consecutive blade periods over which the average blade period is calculated does not include the determined blade period, and wherein the pre-determined values of said ratio are bounded by the possible values of the equations:

$$\text{Ratio}_{MAX} = AV \times \frac{D+1+2 \times j}{AV+M-2 \times j}$$

and $$\text{Ratio}_{MIN} = AV \times \frac{D+1-2 \times j}{AV+M+2 \times j}$$

where: $\text{Ratio}_{MAX}$ is the upper boundary value of the ratio; $\text{Ratio}_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to the nominal blade position expressed as a fraction of the nominal blade separation.

16. A system according to claim 12, wherein the plurality of consecutive blade periods over which the average blade period is calculated includes the determined blade period, and wherein the pre-determined values of said ratio are bounded by the possible values of the equations:

$$\text{Ratio}_{MAX} = AV \times \frac{D+1+2 \times j}{AV+M-D-2 \times j}$$

$$.\text{Ratio}_{MIN} = AV \times \frac{D+1-2 \times j}{AV+M-D+2 \times j}$$

where: $\text{Ratio}_{MAX}$ is the upper boundary value of the ratio; $\text{Ratio}_{MIN}$ is the lower boundary value of the ratio; AV is the number of signal pulses or peaks over which the average blade period is calculated; M is the number of missing pulses or peaks over a single complete revolution; D is the number of missing pulses or peaks in the determined blade period; and j is the maximum value of blade tip movement relative to the nominal blade position expressed as a fraction of the nominal blade separation.

17. A system according to claim 12, further comprising means for monitoring the amplitude of the pulses or peaks.

18. A system according to claim 12, for monitoring health of a gas turbine.

19. A system according to claim 12, for monitoring the health of an industrial gas turbine.

20. A system according to claim 12, for monitoring the health of a jet engine.

21. A data processor programmed to perform the steps of the method of claim 1.

* * * * *